(12) United States Patent
Bors et al.

(10) Patent No.: US 9,963,858 B2
(45) Date of Patent: May 8, 2018

(54) MOUNTING SYSTEM FOR PLUMBING FIXTURE FITTING

(71) Applicant: Moen Incorporated, North Olmsted, OH (US)

(72) Inventors: Mark S. Bors, Grafton, OH (US); Jeremy S. Culmer, Parma, OH (US)

(73) Assignee: Moen Incorporated, North Olmsted, OH (US)

( * ) Notice: Subject to any disclaimer, the term of this patent is extended or adjusted under 35 U.S.C. 154(b) by 0 days. days.

(21) Appl. No.: 14/610,841

(22) Filed: Jan. 30, 2015

(65) Prior Publication Data

US 2015/0219245 A1    Aug. 6, 2015

Related U.S. Application Data

(60) Provisional application No. 61/934,422, filed on Jan. 31, 2014.

(51) Int. Cl.
| | |
|---|---|
| *F16L 3/08* | (2006.01) |
| *E03C 1/02* | (2006.01) |
| *F16L 3/16* | (2006.01) |
| *E03C 1/00* | (2006.01) |

(52) U.S. Cl.
CPC .............. *E03C 1/021* (2013.01); *F16L 3/16* (2013.01); *E03C 1/00* (2013.01)

(58) Field of Classification Search
CPC .. E03C 1/00; E03C 1/021; E03C 1/042; F16L 3/16; H02G 3/125; H02G 3/12; F16M 13/027

USPC ............................. 248/644, 200.1; 403/109.6
See application file for complete search history.

(56) References Cited

U.S. PATENT DOCUMENTS

| | | | | |
|---|---|---|---|---|
| 1,927,515 | A | * | 9/1933 | Eastman ................. H02G 3/126 248/343 |
| 2,537,437 | A | | 1/1951 | Aaby |
| 3,162,413 | A | | 12/1964 | Hexdall |
| 3,718,307 | A | * | 2/1973 | Albanese .................. F16L 3/00 248/57 |
| 4,550,451 | A | | 11/1985 | Hubbard |
| 4,654,900 | A | | 4/1987 | McGhee |
| 4,907,766 | A | | 3/1990 | Rinderer |
| 5,060,892 | A | | 10/1991 | Dougherty |
| 5,133,094 | A | | 7/1992 | Clarke, Jr. |
| 5,405,111 | A | | 4/1995 | Medlin, Jr. |
| 5,593,115 | A | | 1/1997 | Lewis |
| 6,402,096 | B1 | | 6/2002 | Ismert et al. |
| 6,422,520 | B1 | | 7/2002 | Hand |
| 6,519,791 | B2 | * | 2/2003 | Randolph ............... E03C 1/021 4/695 |
| 6,666,419 | B1 | | 12/2003 | Vrame |
| 6,945,735 | B1 | | 9/2005 | Doverspike |

(Continued)

OTHER PUBLICATIONS

International Search Report for International App. No. PCT/US2015/013919 dated Apr. 24, 2015 (2 pages).

(Continued)

*Primary Examiner* — Christopher Garft
(74) *Attorney, Agent, or Firm* — Calfee, Halter & Griswold LLP

(57) ABSTRACT

The present invention provides a mounting system for a plumbing fixture fitting that provides a rigid mounting even when the plumbing fixture fitting has an extended height.

12 Claims, 19 Drawing Sheets

(56) References Cited

U.S. PATENT DOCUMENTS

| | | | |
|---|---|---|---|
| 6,967,284 B1* | 11/2005 | Gretz | H02G 3/125 174/50 |
| 7,805,788 B1* | 10/2010 | Proctor | A61G 7/0755 5/648 |
| 8,061,390 B2 | 11/2011 | Condon et al. | |
| 8,141,831 B2 | 3/2012 | Julian et al. | |
| 8,317,142 B2 | 11/2012 | Gallardo et al. | |
| 2003/0006353 A1 | 1/2003 | Dinh et al. | |
| 2005/0121558 A1 | 6/2005 | Kusber et al. | |
| 2008/0196158 A1* | 8/2008 | Jones | E03C 1/32 4/643 |
| 2014/0259383 A1 | 9/2014 | Harris et al. | |

OTHER PUBLICATIONS

Written Opinion of the International Searching Authority for App. No. PCT/US2015/013919 dated Apr. 24, 2015 (4 pages).

Mounting Systems Mounting Rigidity Curves, the mounting rigidity curves in the cited document were obtained from tests conducted on mounting systems that were publicly available prior to Jan. 31, 2014, these tests were conducted by Moen Incorporated, the applicant and assignee of the application, the mounting rigidity curves in the cited document have not been published (4 pages).

* cited by examiner

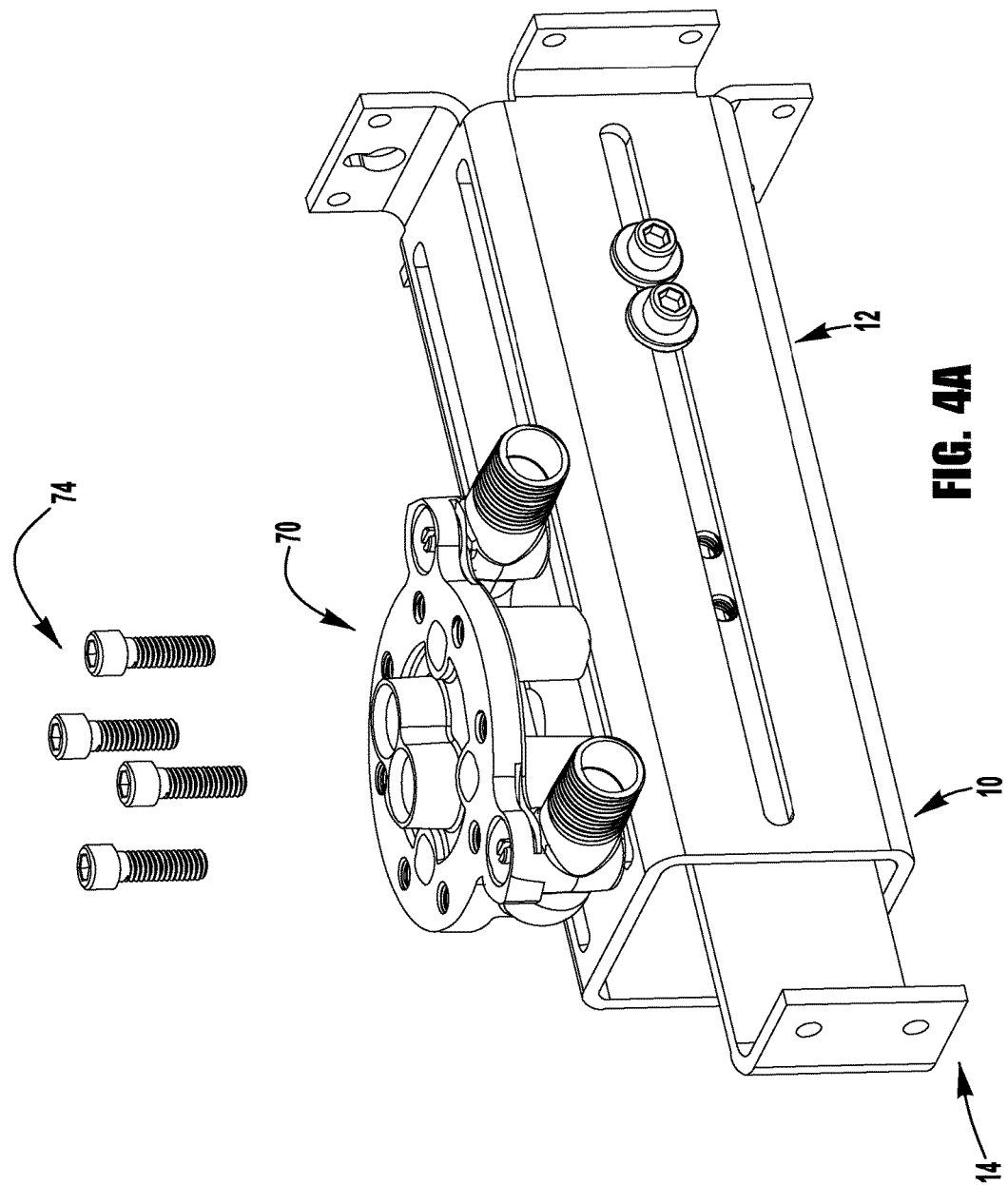

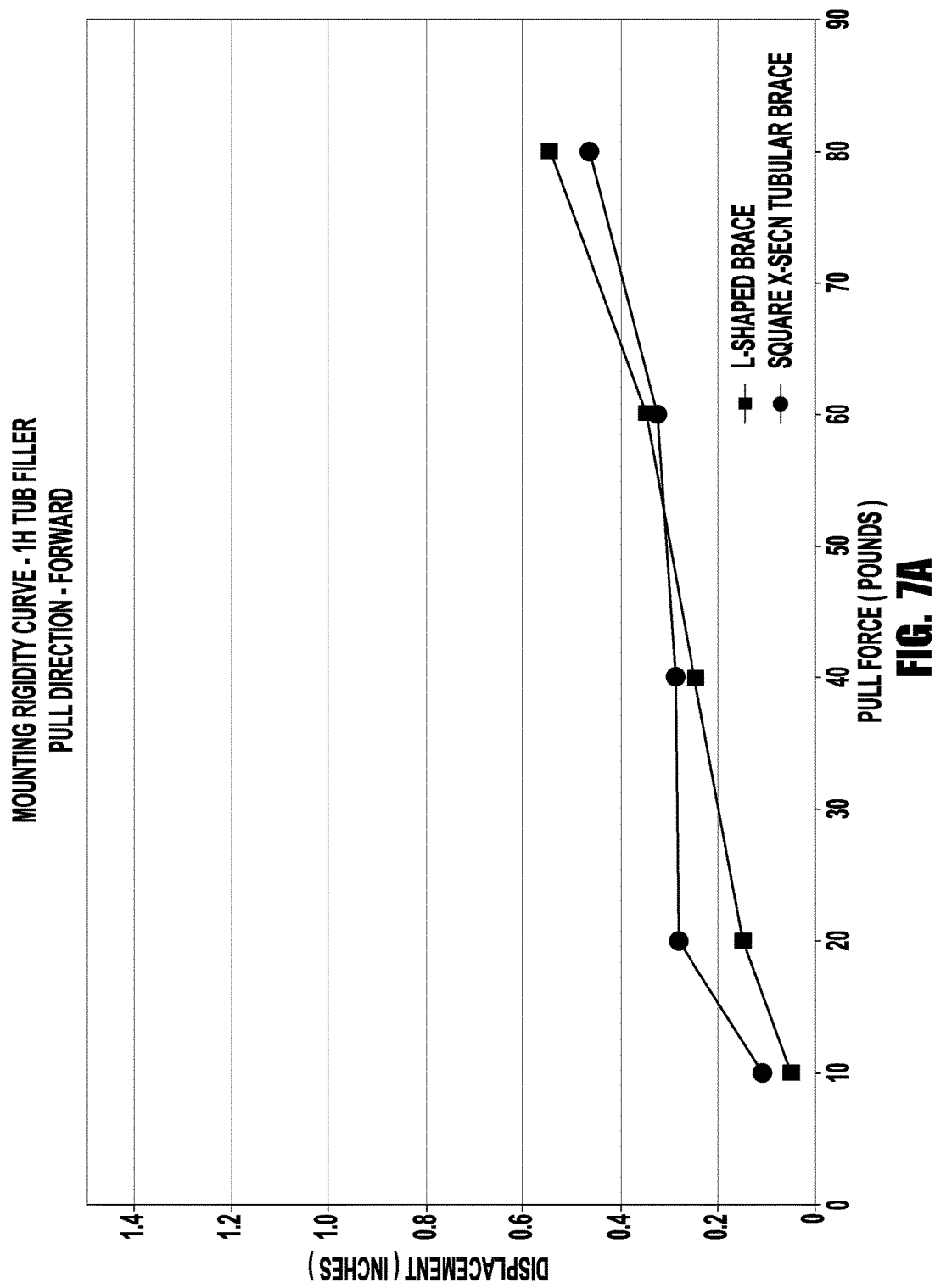

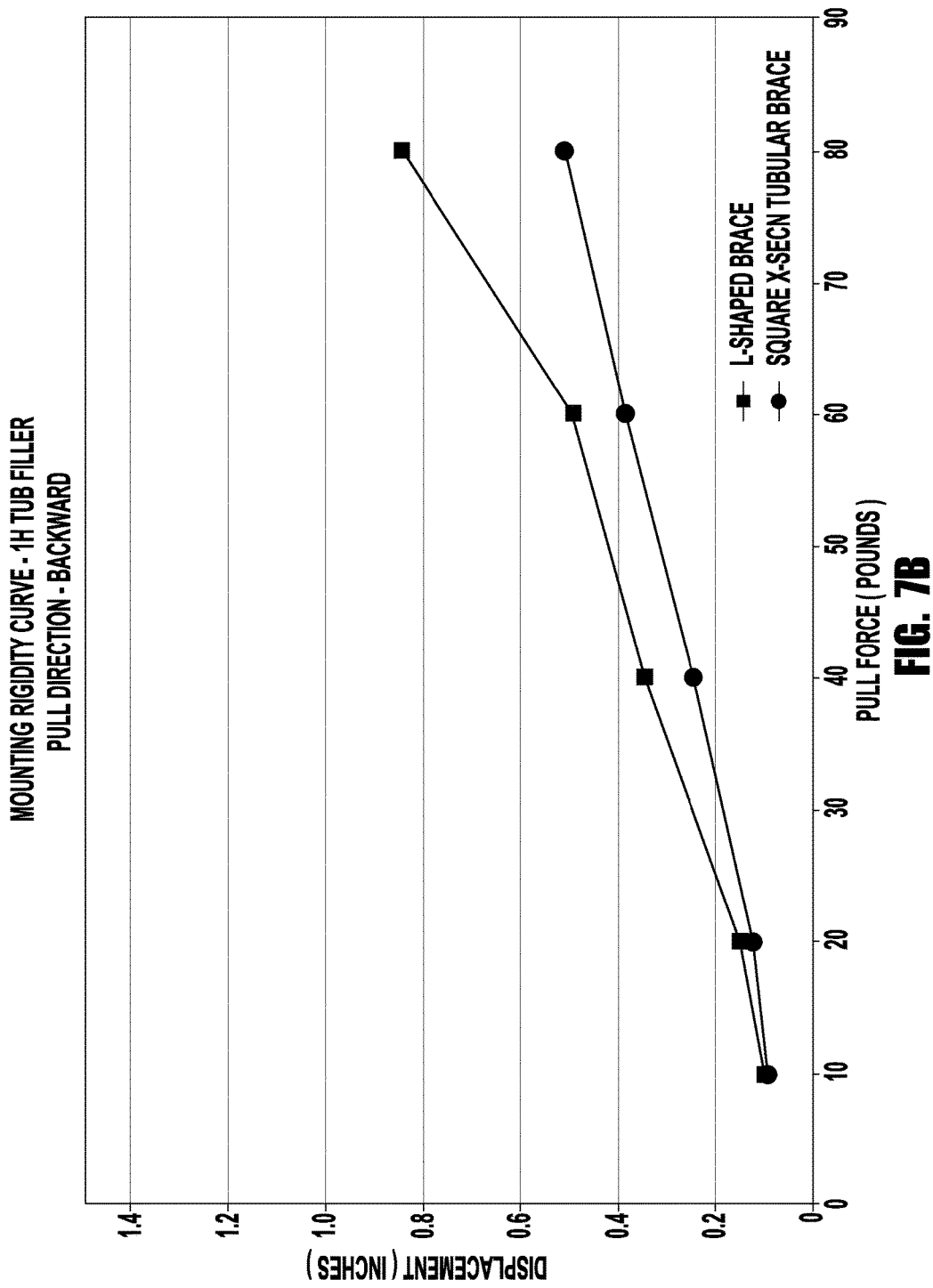

MOUNTING SYSTEM FOR PLUMBING FIXTURE FITTING

CROSS-REFERENCE TO RELATED APPLICATION

This application claims the benefit of U.S. Provisional Application No. 61/934,422, filed Jan. 31, 2014, the entire disclosure of which is hereby incorporated by reference.

FIELD

The present invention relates generally to a mounting system for a plumbing fixture fitting and, more particularly, to a mounting system for a plumbing fixture fitting that provides a rigid mounting even when the plumbing fixture fitting has an extended height (such as a floor mounted tub filler).

BACKGROUND

When installing a plumbing fixture fitting that has an extended height (such as a floor mounted tub filler), the plumbing fixture fitting needs to be rigidly mounted to the mounting surface.

Plumbing fixture fittings having an extended height can be difficult to mount. Additionally, there can be issues with the stability of plumbing fixture fittings having an extended height.

SUMMARY

The present invention provides a mounting system for a plumbing fixture fitting that provides a rigid mounting even when the plumbing fixture fitting has an extended height.

In an exemplary embodiment, the mounting system includes a bracket and a brace. The bracket includes a bracket base and a bracket flange. The bracket base forms a non-closed surface. The bracket base has a first end and a second end. The first end of the bracket base has an opening. The bracket base has a cross-section at or near the first end that is a simple closed shape. The bracket base includes at least two of a top portion, a first side portion, and a second side portion. The top portion is operable to extend in a generally horizontal plane. The first side portion and the second side portion are operable to extend in a generally non-horizontal plane. At least one of the top portion, the first side portion, and the second side portion includes a brace fastener opening extending therethrough. The bracket flange is operable to be connected to a generally vertical bracket mounting surface. The brace includes a brace base and a brace flange. The brace base is operable to extend in at least one of a generally horizontal plane and a generally non-horizontal plane. The generally non-horizontal plane in which the brace base extends is the same as the generally non-horizontal plane in which the first side portion and the second side portion of the bracket base extend. The brace base is operable to extend through the opening in the bracket base. The brace base includes a bracket fastener opening extending therethrough. The brace flange is operable to be connected to a generally vertical brace mounting surface. The brace mounting surface is opposite the bracket mounting surface. The brace base is operable to be connected to at least one of the top portion, the first side portion, and the second side portion of the bracket base via the bracket fastener opening in the brace base and the brace fastener opening in the bracket base. At least one of the brace fastener opening in the bracket base and the bracket fastener opening in the brace base is a channel. The bracket is operable to be connected to the bracket mounting surface. The brace is operable to be connected to the brace mounting surface. At least one of the top portion, the first side portion, and the second side portion of the bracket base is operable to be connected to a component of a plumbing fixture fitting having an extended height. The bracket and the brace can be rigidly mounted between the bracket mounting surface and the brace mounting surface. The plumbing fixture fitting can be rigidly mounted to the bracket.

In an exemplary embodiment, the mounting system includes a bracket and a brace. The bracket includes a bracket base and a bracket flange. The bracket base forms a non-closed surface. The bracket base has a first end and a second end. The first end of the bracket base has an opening. The second end of the bracket base has an opening. The bracket base has a generally constant cross-section that is a polygon. The bracket base includes at least two of a top portion, a first side portion, and a second side portion. The top portion is operable to extend in a generally horizontal plane. The first side portion and the second side portion are operable to extend in a generally vertical plane. At least one of the top portion, the first side portion, and the second side portion includes a brace fastener opening extending therethrough. The bracket flange is operable to be connected to a generally vertical bracket mounting surface. The brace includes a brace base and a brace flange. The brace base is operable to extend in at least one of a generally horizontal plane and a generally vertical plane. The brace base is operable to extend through the opening in the bracket base. The brace base includes a bracket fastener opening extending therethrough. The brace flange is operable to be connected to a generally vertical brace mounting surface. The brace mounting surface is opposite the bracket mounting surface. The brace base is operable to be connected to at least one of the top portion, the first side portion, and the second side portion of the bracket base via the bracket fastener opening in the brace base and the brace fastener opening in the bracket base. At least one of the brace fastener opening in the bracket base and the bracket fastener opening in the brace base is a channel. The bracket is operable to be connected to the bracket mounting surface. The brace is operable to be connected to the brace mounting surface. At least one of the top portion, the first side portion, and the second side portion of the bracket base is operable to be connected to a component of a plumbing fixture fitting having an extended height. The bracket and the brace can be rigidly mounted between the bracket mounting surface and the brace mounting surface. The plumbing fixture fitting can be rigidly mounted to the bracket.

In an exemplary embodiment, the mounting system includes a bracket and a brace. The bracket includes a bracket base and a bracket flange. The bracket base forms a non-closed surface. The bracket base has a first end and a second end. The first end of the bracket base has an opening. The second end of the bracket base has an opening. The bracket base has a generally constant cross-section that is a polygon. The bracket base includes at least two of a top portion, a first side portion, and a second side portion. The top portion is operable to extend in a generally horizontal plane. The first side portion and the second side portion are operable to extend in a generally vertical plane. At least one of the first side portion and the second side portion includes a brace fastener opening extending therethrough. At least one of the top portion, the first side portion, and the second side portion includes a fitting fastener opening extending therethrough. The bracket flange includes a bracket mounting fastener opening extending therethrough. The bracket flange is operable to be connected to a generally vertical bracket mounting surface. The brace includes a brace base and a brace flange. The brace base and the brace flange are generally L-shaped. The brace base is operable to extend in at least one of a generally horizontal plane and a generally vertical plane. The brace base is operable to extend through the opening in the bracket base. The brace base includes a bracket fastener opening extending therethrough. The brace flange includes a brace mounting fastener opening extending therethrough. The brace flange is operable to be connected to a generally vertical brace mounting surface. The brace mounting surface is opposite the bracket mounting surface. The bracket fastener opening in the brace base is operable to be aligned with the brace fastener opening in the bracket base. The brace base is operable to be connected to at least one of the top portion, the first side portion, and the second side portion of the bracket base via a bracket/brace fastener extending through the aligned bracket fastener opening in the brace base and the brace fastener opening in the bracket base. At least one of the brace fastener opening in the bracket base and the bracket fastener opening in the brace base is a channel. The bracket is operable to be connected to the bracket mounting surface via a bracket mounting fastener extending through the bracket mounting fastener opening in the bracket flange and into the bracket mounting surface. The brace is operable to be connected to the brace mounting surface via a brace mounting fastener extending through the brace mounting fastener opening in the brace flange and into the brace mounting surface. The fitting fastener opening in the bracket base is operable to be aligned with an opening in a component of a plumbing fixture fitting having an extended height. At least one of the top portion, the first side portion, and the second side portion of the bracket base is operable to be connected to the component of the plumbing fixture fitting via a fitting fastener extending through the aligned fitting fastener opening in the bracket base and the opening in the component of the plumbing fixture fitting. The bracket and the brace can be rigidly mounted between the bracket mounting surface and the brace mounting surface. The plumbing fixture fitting can be rigidly mounted to the bracket.

BRIEF DESCRIPTION OF THE DRAWINGS

—FIG. 1a is an exploded perspective view and FIG. 1b is an assembled perspective view;

FIGS. 4a-4e are perspective views showing installation of a one-handle plumbing fixture fitting using the mounting system of FIGS. 1a-1b and 2—FIG. 4a shows assembly of a valve manifold of the plumbing fixture fitting to the bracket, FIG. 4b shows mounting of the bracket to a bracket mounting surface, FIG. 4c shows mounting of the brace to a brace mounting surface, FIG. 4d shows plumbing of supply lines to the valve manifold, and FIG. 4e shows the one-handle plumbing fixture fitting as installed;

—FIG. 6a shows the forward and backward pull directions and FIG. 6b shows the left and right pull directions; and FIGS. 7a-7d are graphs showing results of the displacement vs. pull force tests conducted according to the test setup of FIGS. 6a-6b —FIG. 7a shows displacement vs. forward pull force test results, FIG. 7b shows displacement vs. backward pull force test results, FIG. 7c shows displacement vs. left pull force test results, and FIG. 7d shows displacement vs. right pull force test results.

DETAILED DESCRIPTION

The present invention provides a mounting system for a plumbing fixture fitting that provides a rigid mounting even when the plumbing fixture fitting has an extended height. In an exemplary embodiment, the plumbing fixture fitting is a floor mounted tub filler. However, one of ordinary skill in the art will appreciate that the plumbing fixture fitting could be any plumbing fixture fitting that has an extended height.

Figure 1A:
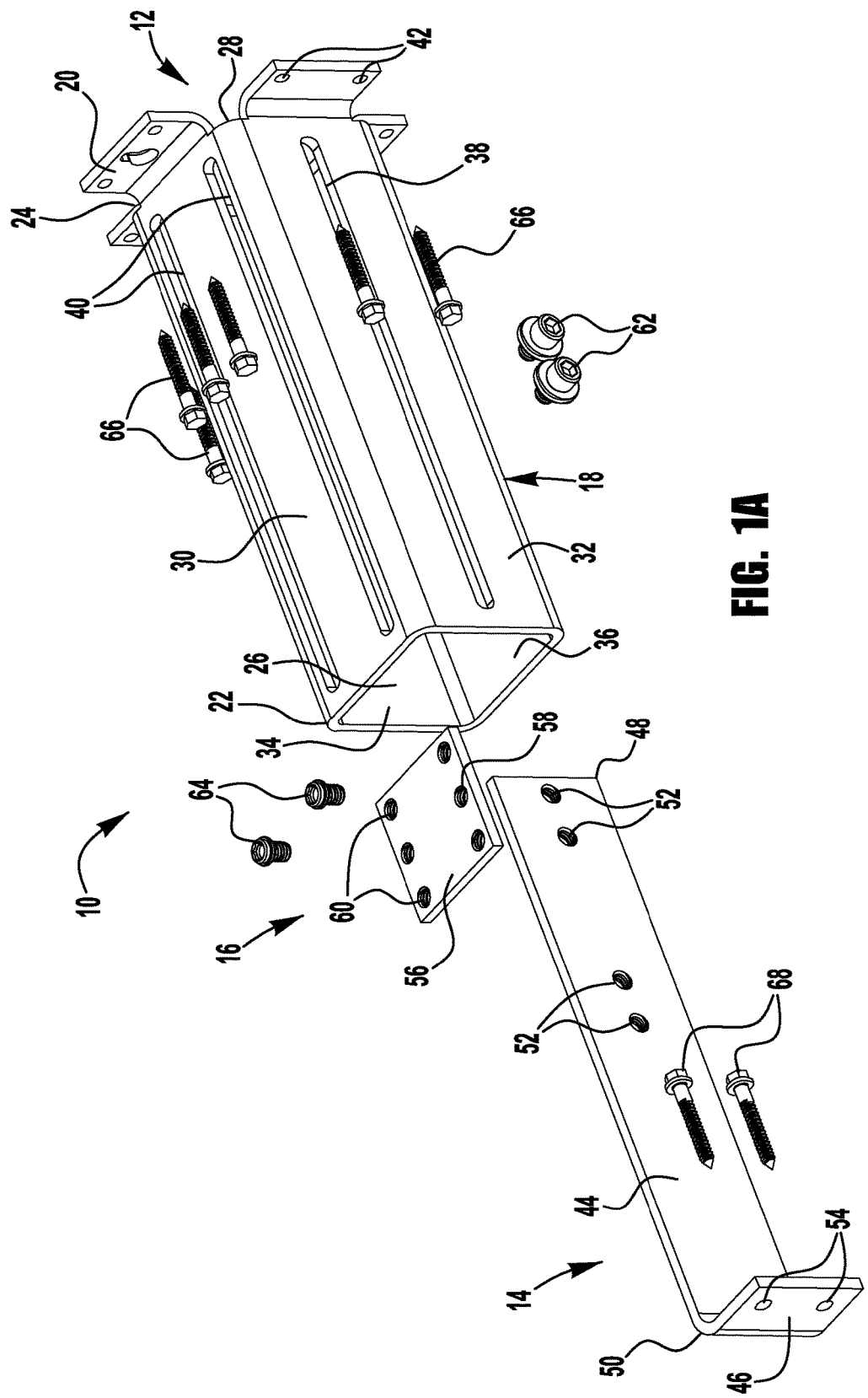
FIGS. 1a-1b are perspective views of a mounting system for a plumbing fixture fitting according to an exemplary embodiment of the present invention, the mounting system including a bracket and a base
Figure 1B:
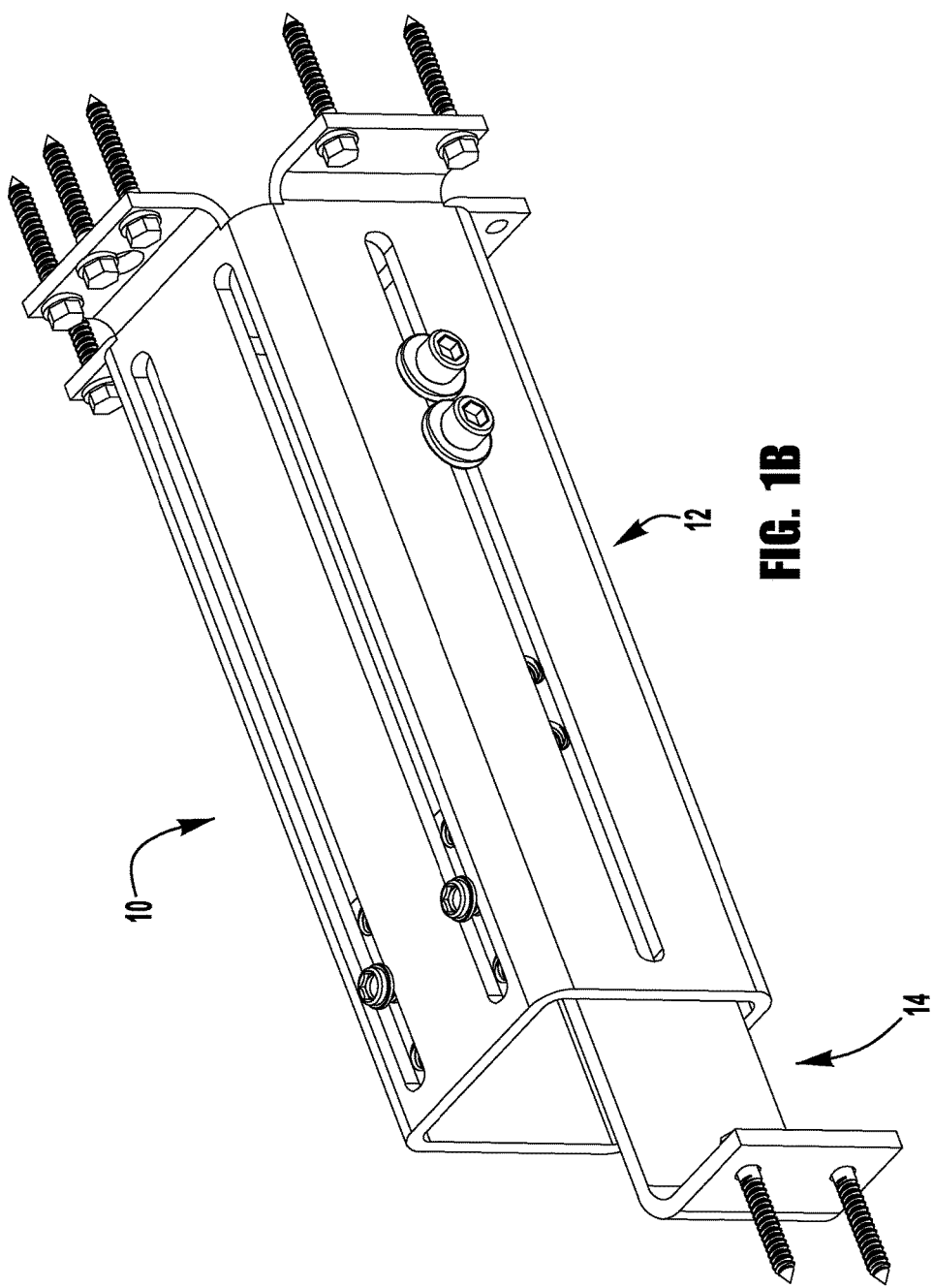
Figure 2:
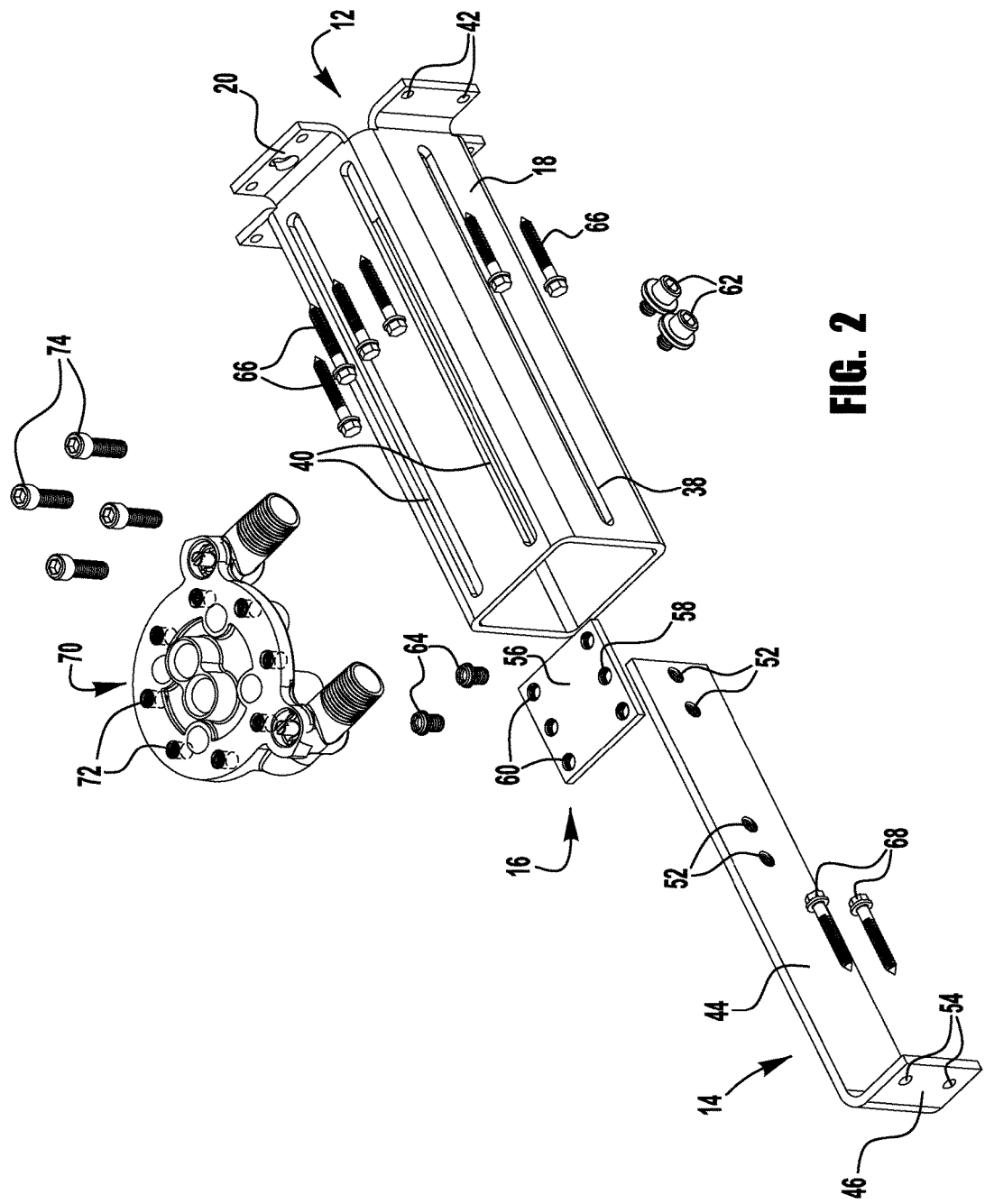
FIG. 2 is an exploded perspective view of the mounting system of FIGS. 1a-1b used in connection with a one-handle plumbing fixture fitting according to an exemplary embodiment of the present invention.
Figure 3:
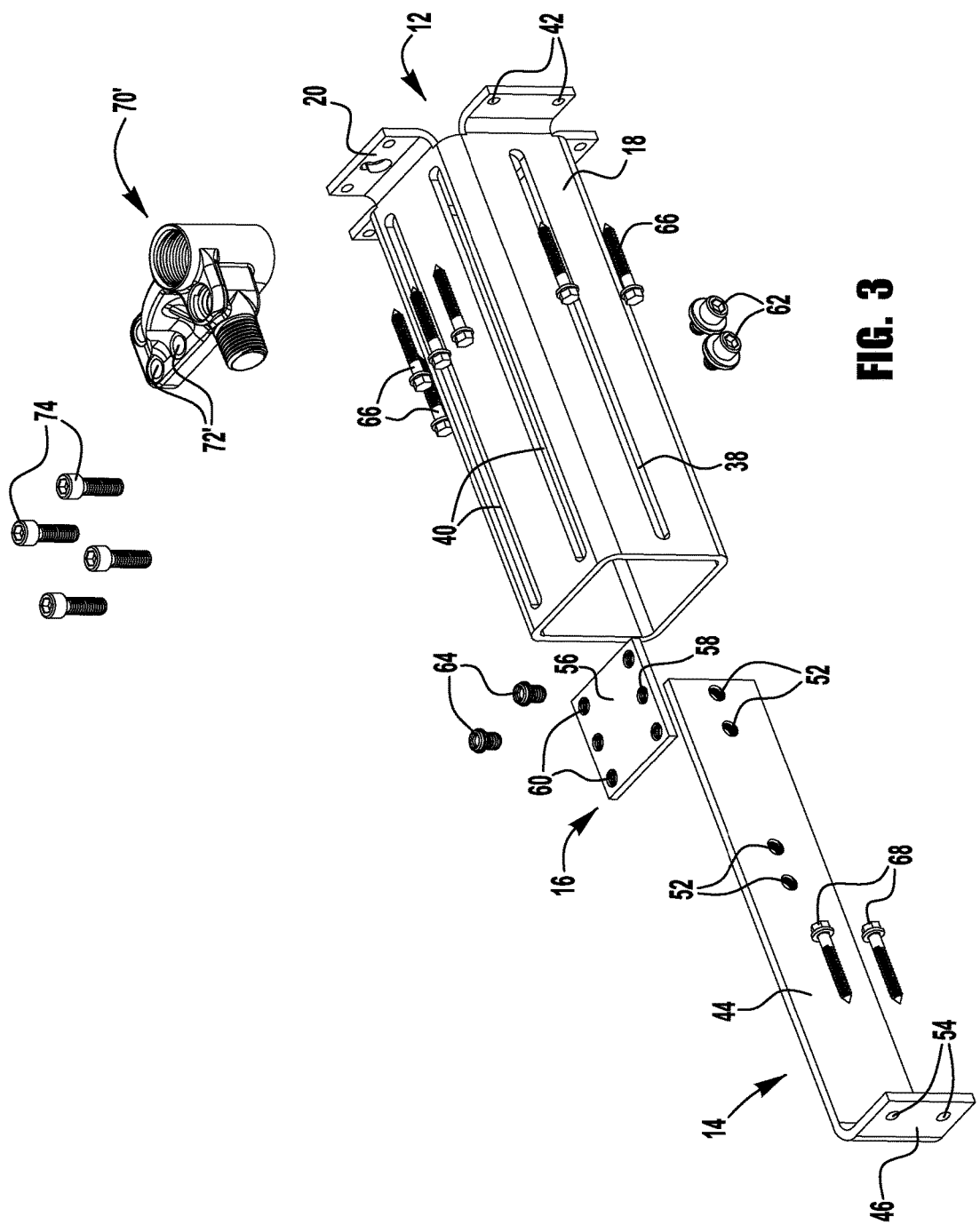
FIG. 3 is an exploded perspective view of the mounting system of FIGS. 1a-1b used in connection with a two-handle plumbing fixture fitting according to an exemplary embodiment of the present invention.
Figure 4B:
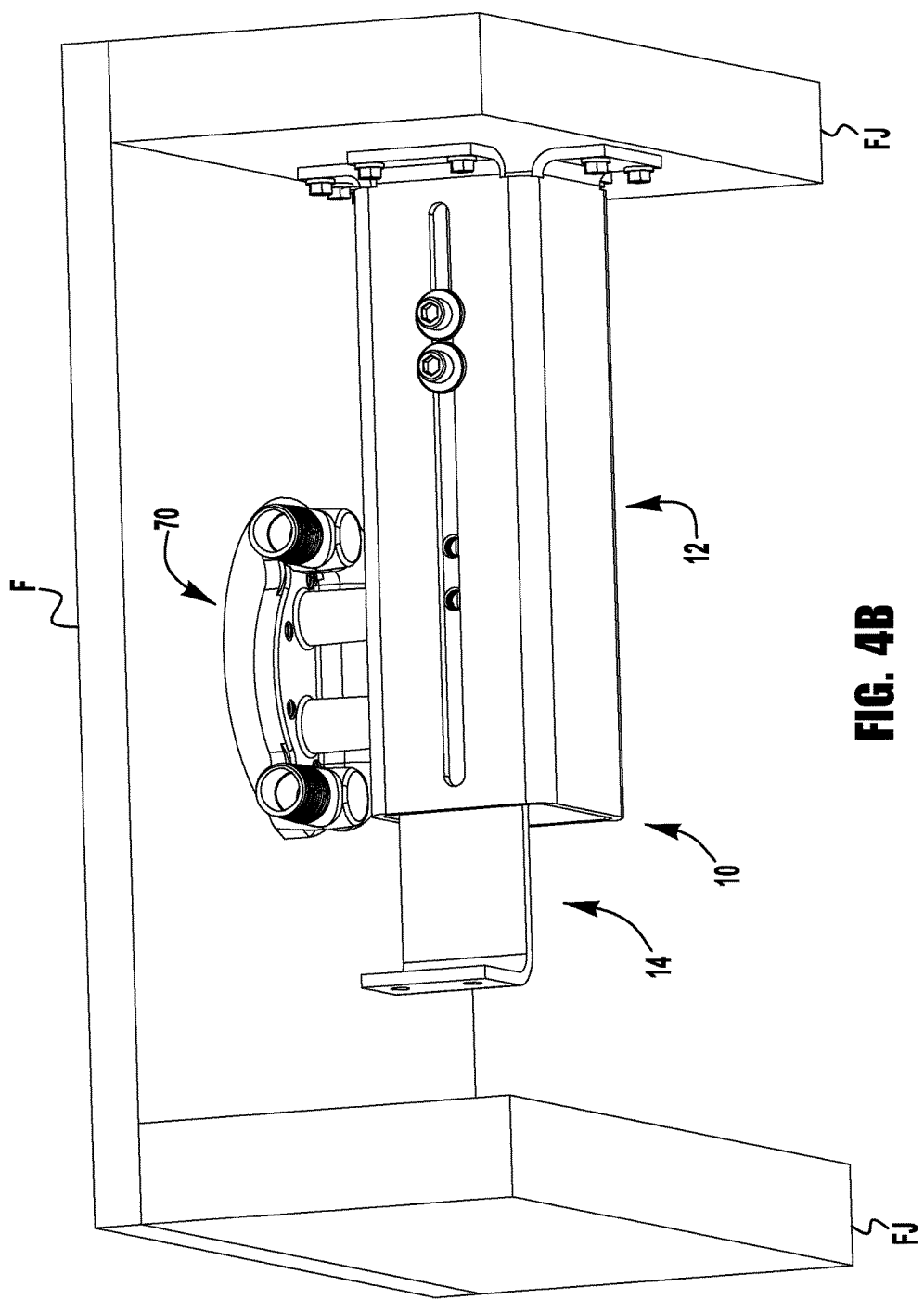
Figure 4C:
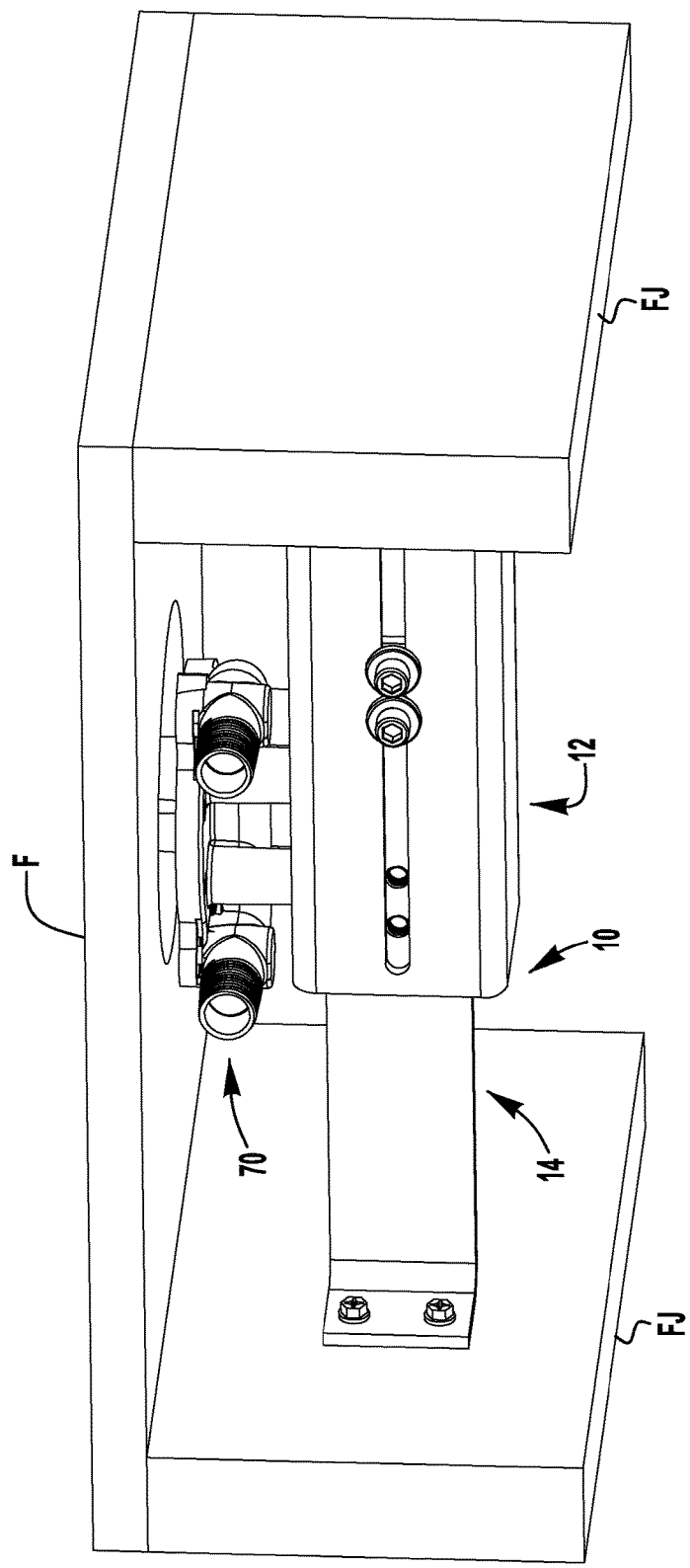
Figure 4D:
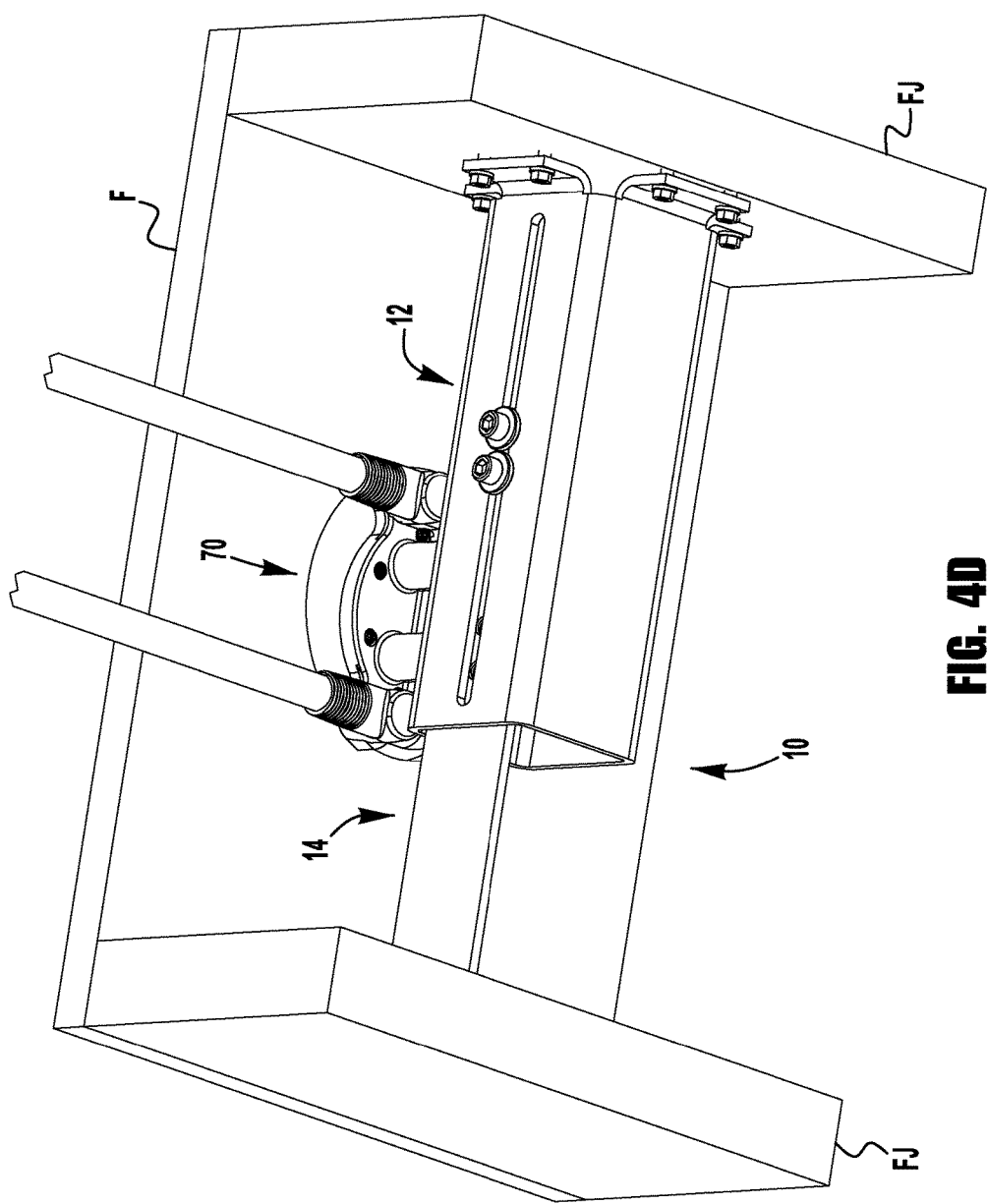
Figure 4E:
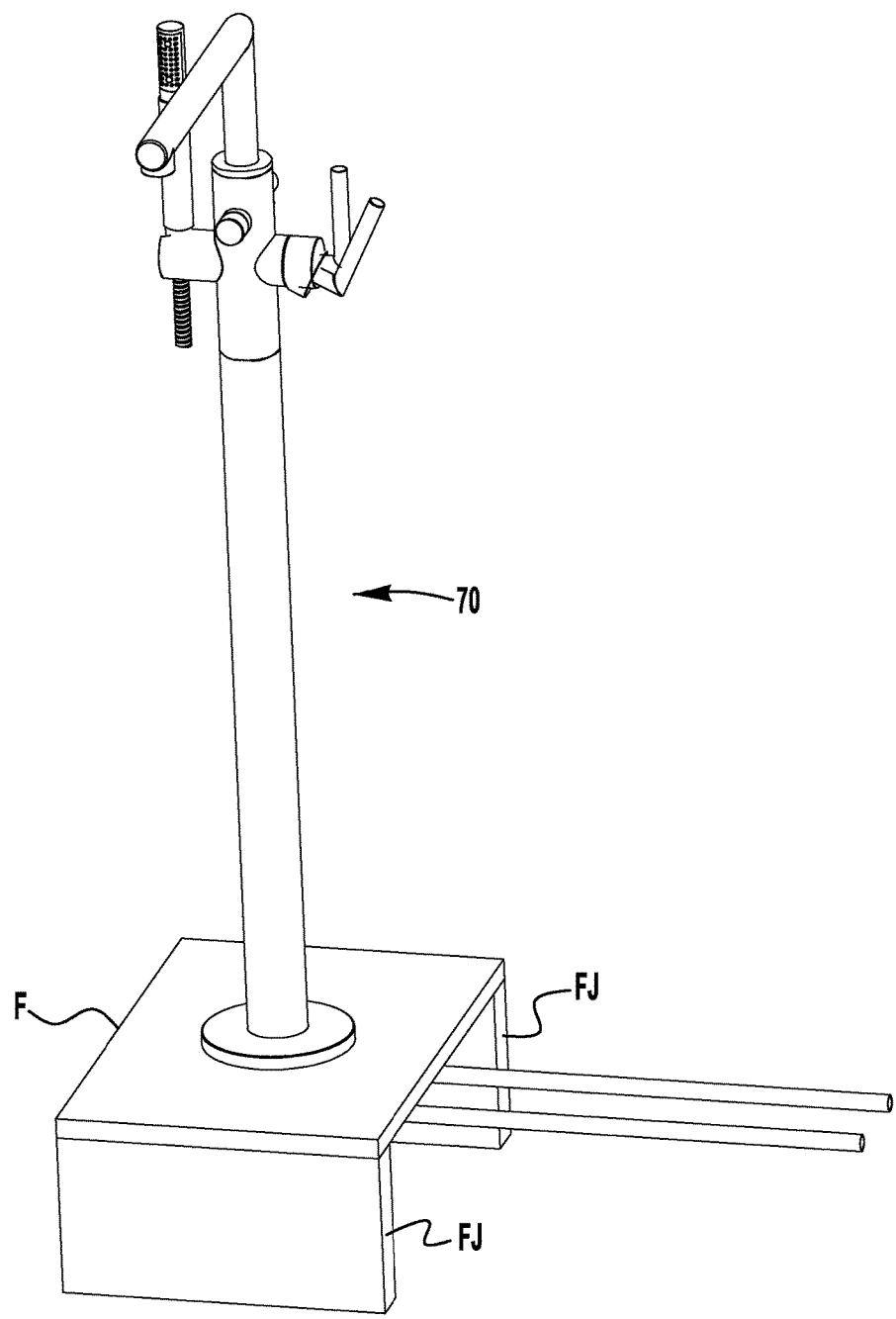

Exemplary embodiments of a mounting system 10 of the present invention are illustrated in FIGS. 1a-1b, 2, and 3. FIGS. 1a-1b illustrate components of the mounting system 10. FIG. 2 illustrates components of the mounting system 10 in connection with a one-handle plumbing fixture fitting. FIG. 3 illustrates components of the mounting system 10 in connection with a two-handle plumbing fixture fitting. In the illustrated embodiments, the mounting system 10 includes a bracket 12, a brace 14, a plate 16, and fasteners (detailed below).

As best shown in FIGS. 1a-1b, 2, and 3, the bracket 12 includes a bracket base 18 and at least one bracket flange 20. In the illustrated embodiment, the bracket 12 includes the bracket base 18 and four bracket flanges 20. In an exemplary embodiment, the bracket base 18 forms a non-closed surface. The bracket base 18 has a first end 22 and a second end 24. The first end 22 of the bracket base 18 has an opening 26. In the illustrated embodiment, the second end 24 of the bracket base 18 has an opening 28. In an exemplary embodiment, the bracket base 18 has a cross-section at or near the first end 22 that is a simple closed shape. In an exemplary embodiment, the bracket base 18 has a generally constant cross-section that is a polygon. In the illustrated embodiment, the bracket base 18 is a generally square-shaped tube. In an exemplary embodiment, the bracket 12 is formed of powder coated stainless steel.

In an exemplary embodiment, the bracket base 18 includes at least two of a top portion 30, a first side portion 32, and a second side portion 34. In the illustrated embodiment, the bracket base 18 includes the top portion 30, the first side portion 32, the second side portion 34, and a bottom portion 36. In an exemplary embodiment, the top portion 30 is operable to extend in a generally horizontal plane, and the first side portion 32 and the second side portion 34 are operable to extend in a generally non-horizontal plane. In the illustrated embodiment, the top portion 30 and the bottom portion 36 are operable to extend in a generally horizontal plane, and the first side portion 32 and the second side portion 34 are operable to extend in a generally vertical plane. At least one of the top portion 30, the first side portion 32, and the second side portion 34 of the bracket base 18 is operable to be connected to a plumbing fixture fitting or a component thereof.

In an exemplary embodiment, at least one of the top portion 30, the first side portion 32, and the second side portion 34 includes at least one brace fastener opening 38 extending therethrough. In the illustrated embodiment, the first side portion 32 includes one brace fastener opening 38 in the form of a channel extending along a longitudinal length of the bracket base 18. At least one of the top portion 30, the first side portion 32, and the second side portion 34 includes at least one fitting fastener opening 40 extending therethrough. In the illustrated embodiment, the top portion 30 includes two fitting fastener openings 40 in the form of two channels extending along the longitudinal length of the bracket base 18.

In an exemplary embodiment, the bracket flanges 20 are integrally formed with the bracket base 18. Each bracket flange 20 includes at least one bracket mounting fastener opening 42 extending therethrough. In the illustrated embodiment, one flange 20 includes three bracket mounting fastener openings 42, and each remaining flange 20 includes two bracket mounting fastener openings 42. The bracket flanges 20 are operable to be connected to a generally vertical bracket mounting surface.

As best shown in FIGS. 1a-1b, 2, and 3, the brace 14 includes a brace base 44 and at least one brace flange 46. In the illustrated embodiment, the brace 14 includes the brace base 44 and one brace flange 46. The brace base 44 has a first end 48 and a second end 50. In the illustrated embodiment, the brace 14 is generally L-shaped. In an exemplary embodiment, the brace 14 is formed of stainless steel.

In an exemplary embodiment, the brace base 44 is operable to extend in at least one of a generally horizontal plane and a generally non-horizontal plane. The generally non-horizontal plane in which the brace base 44 extends is the same as the generally non-horizontal plane in which the first side portion 32 and the second side portion 34 of the bracket base 18 extend. In an exemplary embodiment, the brace base 44 is operable to extend in at least one of a generally horizontal plane and a generally vertical plane. In the illustrated embodiment, the brace base 44 is operable to extend in a generally vertical plane. The brace base 44 is operable to extend through the opening 26 in the first end 22 of the bracket base 18.

In an exemplary embodiment, the brace base 44 includes at least one bracket fastener opening 52 extending therethrough. In the illustrated embodiment, the brace base 44 includes two bracket fastener openings 52 in the form of circles near the first end 48 of the brace base 44. In an exemplary embodiment, the bracket fastener openings 52 are threaded. The brace base 44 is operable to be connected to at least one of the top portion 30, the first side portion 32, and the second side portion 34 of the bracket base 18 via the bracket fastener opening 52 in the brace base 18 and the brace fastener opening 38 in the bracket base 18. In an exemplary embodiment, at least one of the brace fastener opening 38 in the bracket base 18 and the bracket fastener opening 52 in the brace base 18 is a channel.

In an exemplary embodiment, the brace flange 46 is integrally formed with the brace base 44. The brace flange 46 includes at least one brace mounting fastener opening 54 extending therethrough. In the illustrated embodiment, the brace flange 46 includes two brace mounting fastener openings 54. The brace flange 46 is operable to be connected to a generally vertical brace mounting surface. The brace mounting surface is opposite the bracket mounting surface.

While the brace 14 has been shown and described as generally L-shaped, one of ordinary skill in the art will appreciate that the brace 14 could have other shapes. For example, the brace 14 could have a shape corresponding to the shape of the bracket 12 so that the brace 14 can be telescopically received in the bracket 12. In an exemplary embodiment, where the bracket 12 is a generally square-shaped tube, the brace 14 could be a generally square-shaped tube.

As best shown in FIGS. 1a-1b, 2, and 3, the plate 16 includes a plate base 56. In the illustrated embodiment, the plate 16 is generally square-shaped. In an exemplary embodiment, the plate 16 is formed of stainless steel.

In an exemplary embodiment, the plate base 56 includes at least one bracket fastener opening 58 extending therethrough and at least one fitting fastener opening 60 extending therethrough. In the illustrated embodiment, the plate base 56 includes two bracket fastener openings 58 and four fitting fastener openings 60. In an exemplary embodiment, the bracket fastener openings 58 and the fitting fastener openings 60 are threaded.

As best shown in FIGS. 1a-1b, during installation, the brace base 44 is aligned with the bracket base 18 so that the bracket fastener openings 52 in the brace base 44 are aligned with the brace fastener opening 38 in the bracket base 18. Bracket/brace fasteners 62 are then extended through the brace fastener opening 38 in the bracket base 18 and threaded into the bracket fastener openings 52 in the brace base 44. In an exemplary embodiment, the bracket/brace fasteners 62 are bolts formed of stainless steel. At this point in the installation, the bracket/brace fasteners 62 do not rigidly connect the brace base 44 to the bracket base 18 so that the position of the brace base 44 can be adjusted relative to the position of the bracket base 18 later in the installation.

As best shown in FIGS. 1a-1b, the plate base 56 is aligned with the bracket base 18 so that the bracket fastener openings 58 in the plate base 56 are aligned with the fitting fastener openings 40 in the bracket base 18. Bracket/plate fasteners 64 are then extended through the fitting fastener openings 40 in the bracket base 18 and threaded into the bracket fastener openings 58 in the plate base 56. In an exemplary embodiment, the bracket/plate fasteners 64 are shoulder bolts formed of carbon steel. At this point in the installation, the bracket/plate fasteners 64 do not rigidly connect the plate base 56 to the bracket base 18 so that the position of the plate base 56 can be adjusted relative to the position of the bracket base 18 later in the installation.

As best shown in FIGS. 4a-4e, a mounting assembly (including the bracket 12, the brace 14, and the plate 16) is connected to adjacent mounting surfaces (such as floor joists FJ). More specifically, the bracket flanges 20 are positioned against a bracket mounting surface (such as a floor joist FJ). Bracket mounting fasteners 66 are then extended through the bracket mounting fastener openings 42 in the bracket flanges 20 and threaded into the bracket mounting surface. In an exemplary embodiment, the bracket mounting fasteners 66 are screws formed of stainless steel. The brace base 44 is extended out of the bracket base 18 until the brace flange 46 is positioned against a brace mounting surface (such as an adjacent floor joist FJ). Brace mounting fasteners 68 are then extended through the brace mounting fastener openings 54 in the brace flange 46 and threaded into the brace mounting surface. In an exemplary embodiment, the brace mounting fasteners 68 are screws formed of stainless steel. At this point in the installation, the bracket/brace fasteners 62 can be tightened to rigidly connect the brace base 44 to the bracket base 18 so that the position of the brace 14 is rigidly fixed relative to the position of the bracket 12.

As best shown in FIGS. 4a-4e, a plumbing fixture fitting or a component thereof 70, 70' (such as a one-handle valve manifold 70 or a two-handle valve manifold 70') is aligned with the bracket base 18 and the plate base 56 so that openings 72, 72' in the plumbing fixture fitting component 70, 70' are aligned with the fitting fastener openings 40 in the bracket base 18 and the fitting fastener openings 60 in the plate base 56. The plate base 56 can be moved along the bracket base 18 so that the plumbing fixture fitting component 70, 70' can be aligned with a mounting hole in the plumbing fixture fitting mounting surface (such as a floor F). Fitting mounting fasteners 74 are then extended through the openings 72, 72' in the plumbing fixture fitting component 70, 70' and the fitting fastener openings 40 in the bracket base 18 and threaded into the fitting fastener openings 60 in the plate base 56. In an exemplary embodiment, the fitting mounting fasteners 74 are screws formed of stainless steel. At this point in the installation, the fitting mounting fasteners 74 can be tightened to rigidly connect the plumbing fixture fitting component 70, 70' to the bracket base 18 and the plate base 56 so that the position of the plumbing fixture fitting component 70, 70' is rigidly fixed relative to the position of the bracket 12. Once installed, the bracket/brace fasteners 62 do not extend through the plumbing fixture fitting or any component thereof 70, 70'.

Figure 5A:
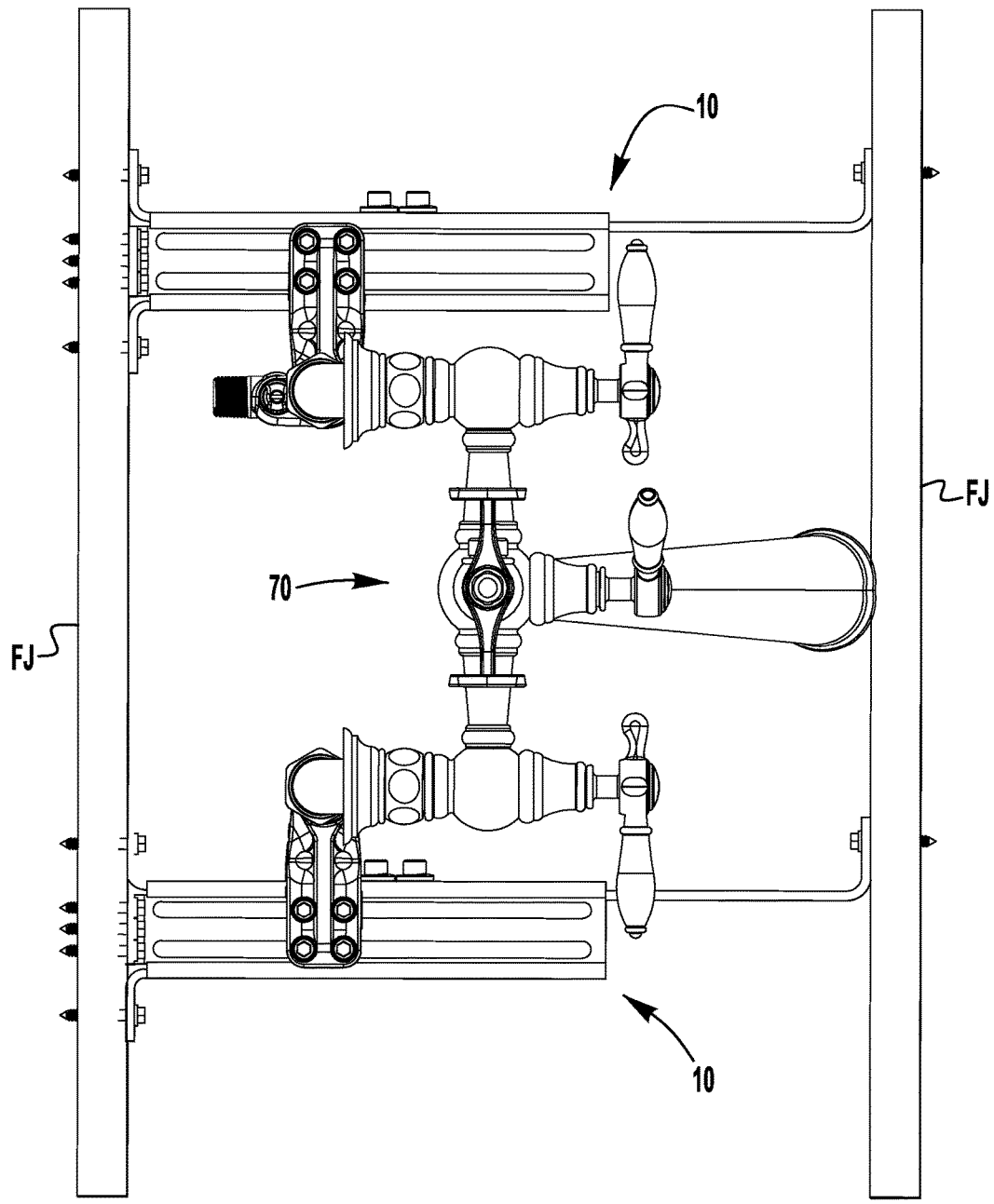
FIGS. 5a-5d show a two-handle plumbing fixture fitting installed using the mounting system of FIGS. 1a-1b and 3—FIGS. 5a-5c show the plumbing fixture fitting mounted between two floor joists and FIG. 5d shows the plumbing fixture fitting straddling a floor joist.
Figure 5B:
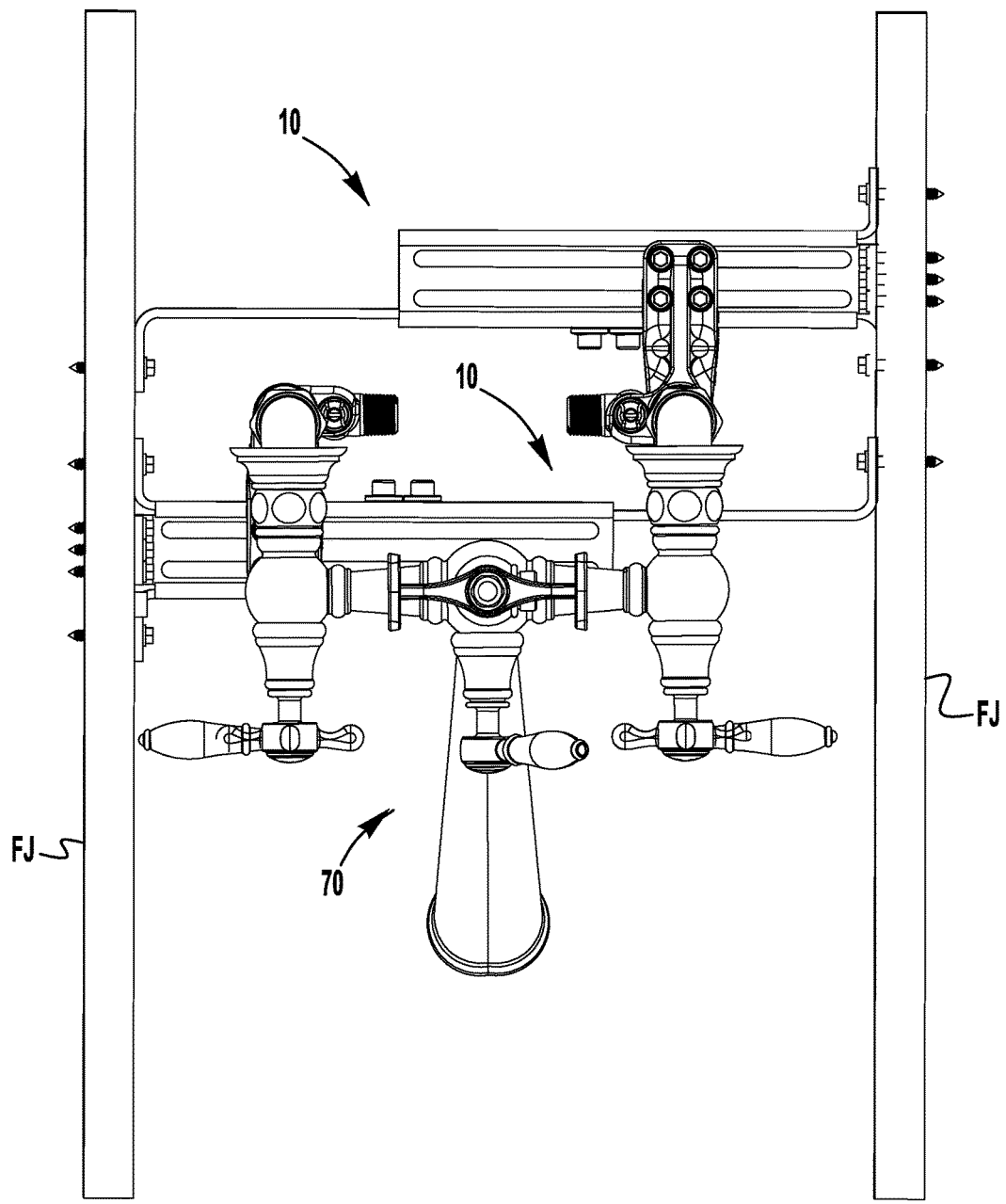
Figure 5C:
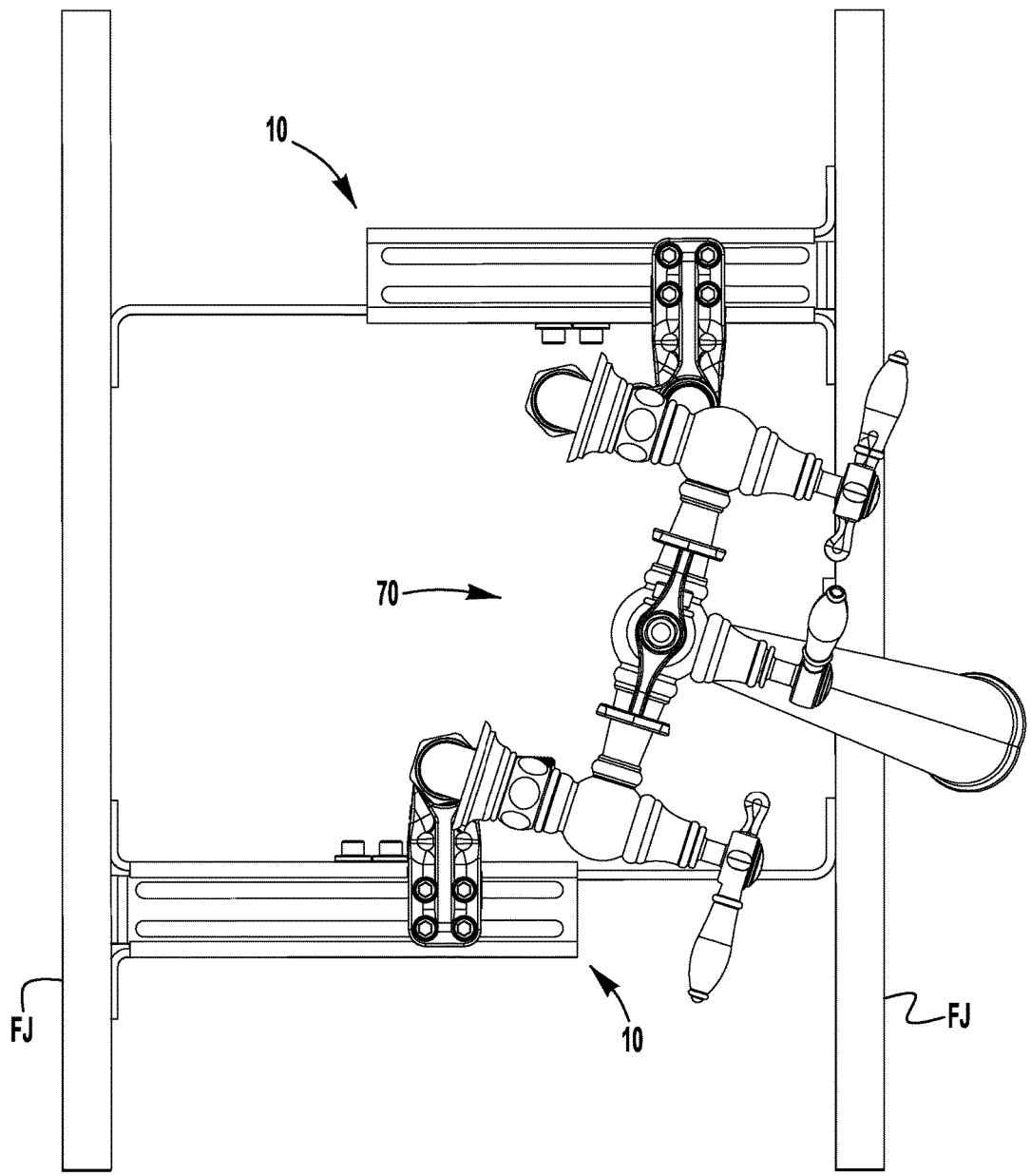
Figure 5D:
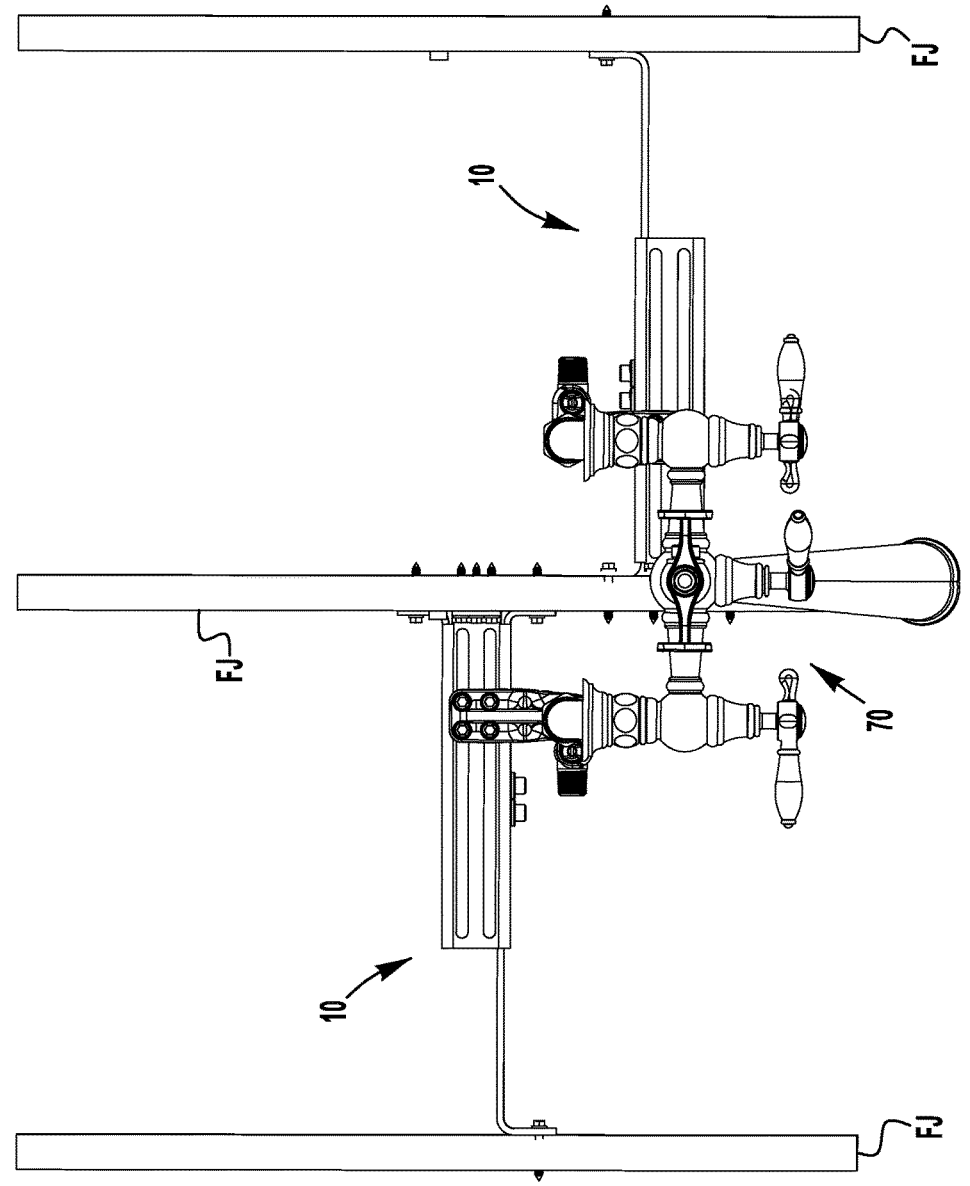

While FIGS. 4a-4e illustrate the installation of a one-handle plumbing fixture fitting 70 using the mounting system 10 of FIGS. 1a-1b and 2, one of ordinary skill in the art will appreciate that the installation of a two-handle plumbing fixture fitting 70' using the mounting system 10 of FIGS. 1a-1b and 3 is generally the same as the installation of the one-handle plumbing fixture fitting 70, except that two-handle valve manifolds 70' are used instead of a one-handle valve manifold 70. FIGS. 5a-5d illustrate two-handle plumbing fixture fittings 70' installed using the mounting system 10 of FIGS. 1a-1b and 3. FIGS. 5a-5c show two-handle plumbing fixture fittings 70' installed between two floor joists FJ. FIG. 5d shows a plumbing fixture fitting 70' straddling a floor joist FJ.

While the installation steps have been described above in a particular order, one of ordinary skill in the art will appreciate that the installation steps do not need to be performed in this order. The installation steps can be performed in any order that results in the bracket 12 being rigidly mounted to the bracket mounting surface, the brace 14 being rigidly mounted to the brace mounting surface, the brace 14 being rigidly connected to the bracket 12, and the plumbing fixture fitting 70, 70' being rigidly mounted to the bracket 12. For example, the plumbing fixture fitting or the component thereof 70, 70' could be connected to the bracket base 18 before or after the bracket 12 and the brace 14 are connected to the bracket mounting surface and the brace mounting surface, respectively.

Additionally, while the mounting system 10 has been shown and described in the illustrated embodiment as including certain components, one of ordinary skill in the art will appreciate that the mounting system 10 does not need to include each of these components and/or the specifics of each of these components. For example, while the mounting system 10 has been shown and described as including a plate 16, one of ordinary skill in the art will appreciate that the mounting system 10 does not need to include a plate 16. Instead of the fitting mounting fasteners 74 extending through the openings 72, 72' in the plumbing fixture fitting component 70, 70' and the fitting fastener openings 40 in the bracket base 18 and threading into the fitting fastener openings 60 in the plate base 56, the fitting mounting fasteners 74 could extend through the openings 72, 72' in the plumbing fixture fitting component 70, 70' and the fitting fastener openings 40 in the bracket base 18 and be secured with a bolt. For another example, while the mounting system 10 has been shown and described with fasteners including bolts and screws, one of ordinary skill in the art will appreciate that the mounting system 10 could include any type of suitable fasteners.

Further, while the mounting system 10 has been shown and described in the illustrated embodiment with the components connected in a particular manner, one of ordinary skill in the art will appreciate that the components of the mounting system 10 can be connected in any manner that results in the bracket 12 being rigidly mounted to the bracket mounting surface, the brace 14 being rigidly mounted to the brace mounting surface, the brace 14 being rigidly connected to the bracket 12, and the plumbing fixture fitting 70, 70' being rigidly mounted to the bracket 12. For example, the brace 12 can be connected to the first side portion 32 (as illustrated), the second side portion 34, or the top portion 30 of the bracket base 18. For another example, the plumbing fixture fitting or the component thereof 70, 70' can be connected to the top portion 30 (as illustrated), the first side portion 32, or the second side portion 34 of the bracket base 18.

Moreover, while the mounting system 10 has been shown and described in connection with a floor mounted tub filler, one of ordinary skill in the art will appreciate that the mounting system 10 could be used with any plumbing fixture fitting having an extended height. For example, the mounting system 10 could be used with a ceiling mounted showerhead having an extended height.

Figure 6A:
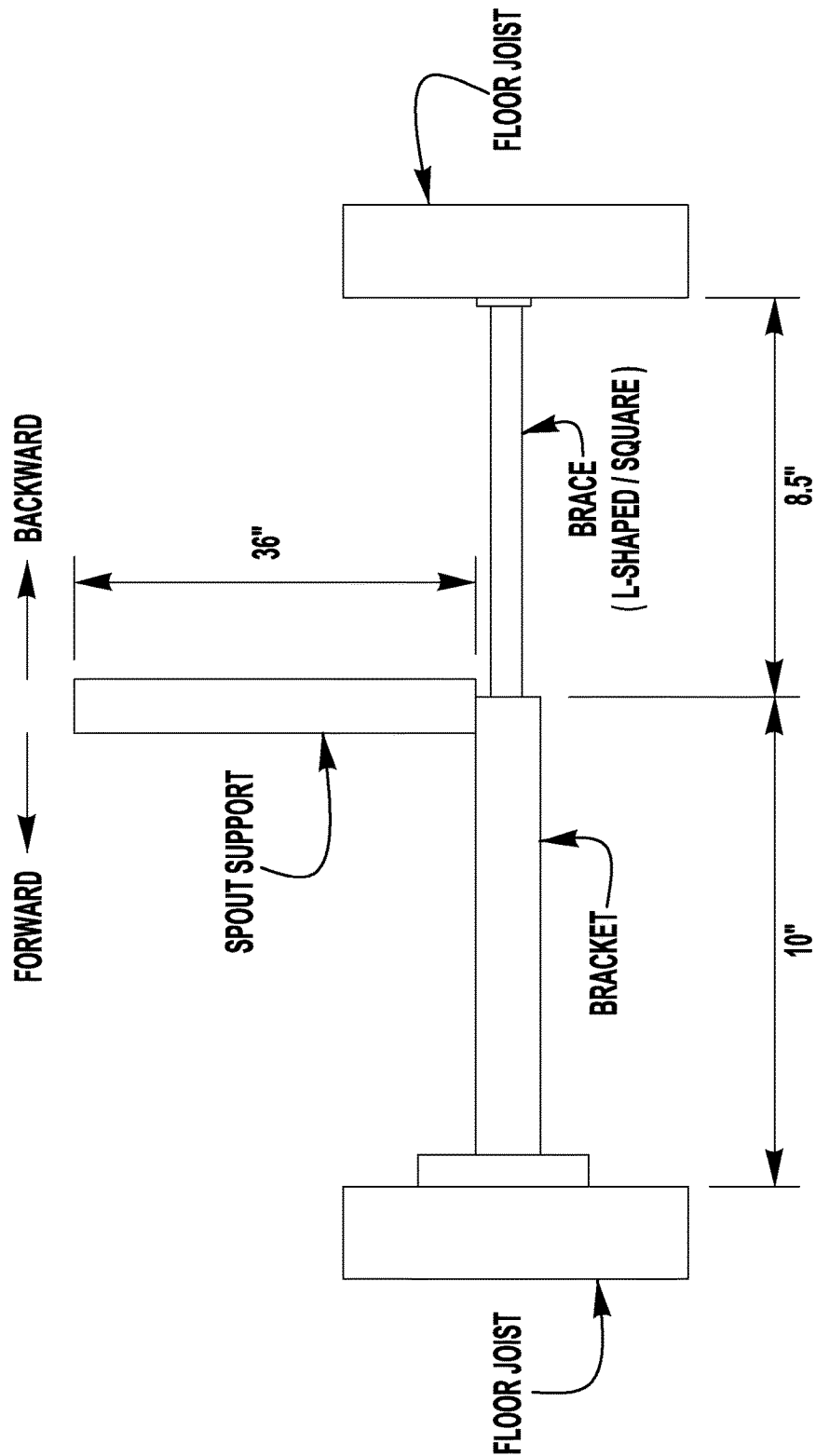
FIGS. 6a-6b are views of a test setup for displacement vs. pull force tests conducted in connection with a one-handle plumbing fixture fitting installed using the mounting system of FIGS. 1a-1b and 2 and a modified mounting system
Figure 6B:
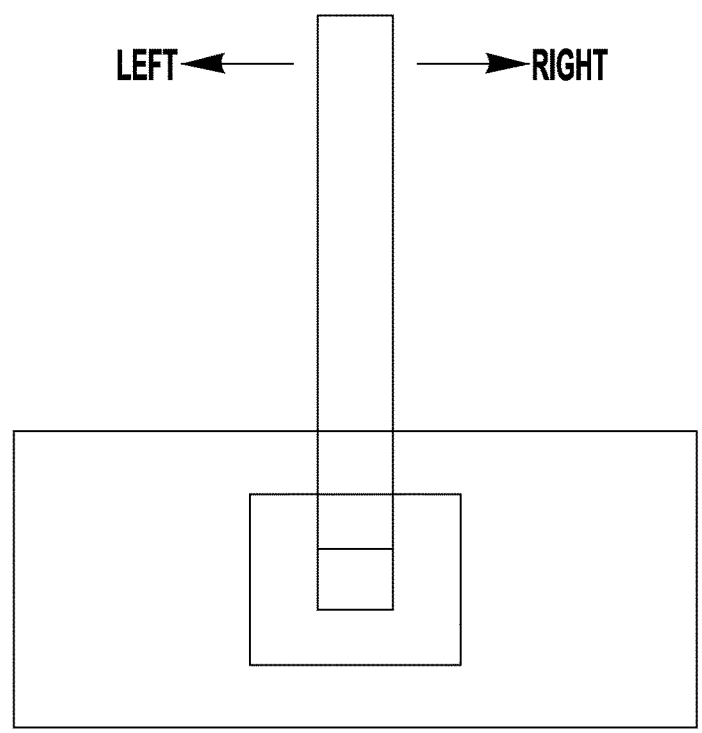

FIGS. 6a-6b illustrate a test setup for displacement vs. pull force tests conducted in connection with a one-handle floor mounted tub filler installed using the mounting system 10 of FIGS. 1a-1b and 2. As illustrated in FIG. 6a, the tests were conducted with the mounting system 10 including the L-shaped brace 14 of FIGS. 1a-1b and 2 and a square cross-section tubular brace in place of the L-shaped brace 14. Each mounting system 10 was evaluated for rigidity by installing the mounting system 10 on a simulated floor joist setup and pulling the mounting system 10 with a standard bar in four directions to forces from ten pounds to eighty pounds (10 lbs-80 lbs.) and measuring the displacement produced. FIG. 6a shows the test setup with forward and backward pull directions. FIG. 6b shows the test setup with left and right pull directions.

Figure 7C:
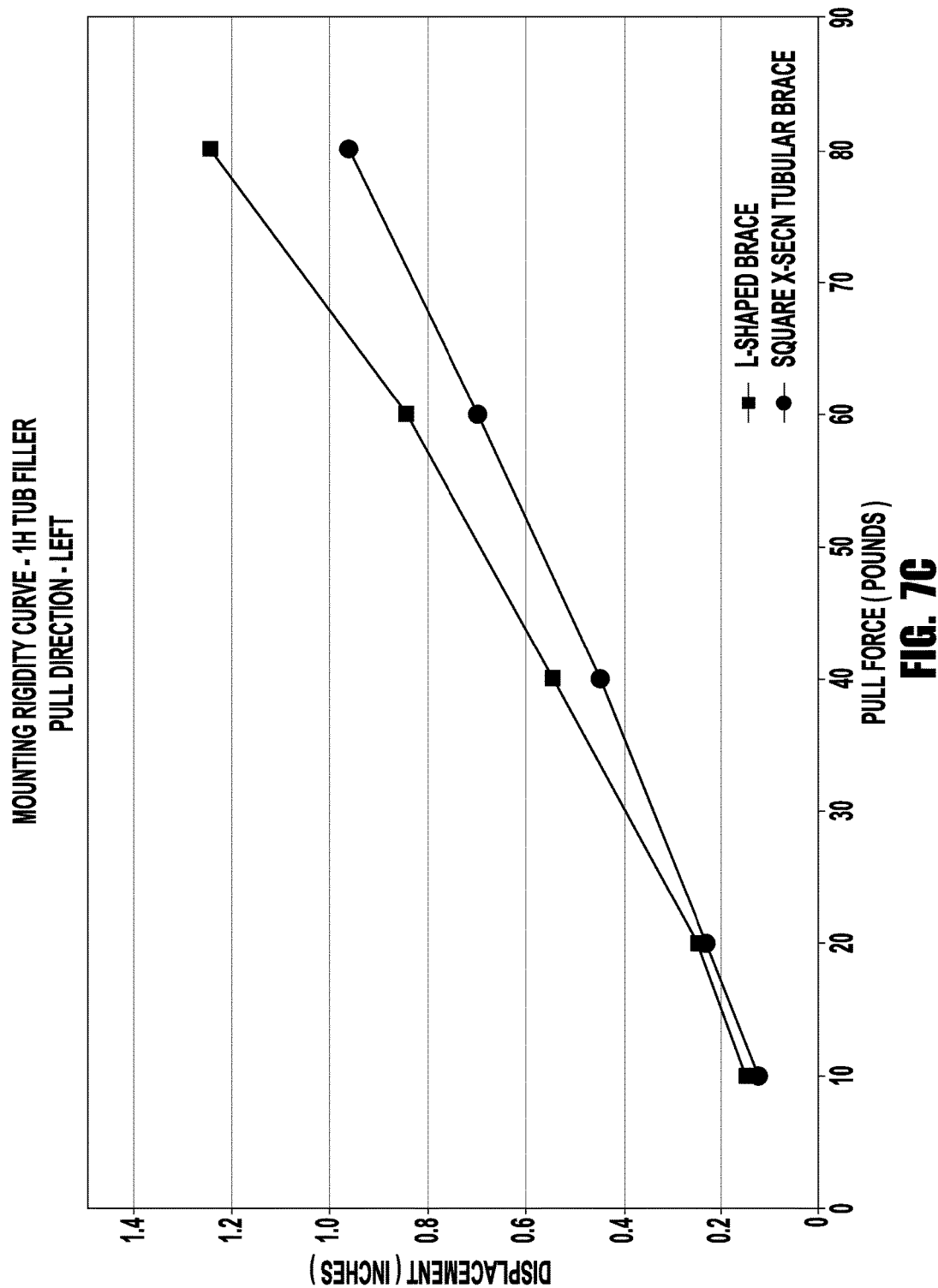
Figure 7D:
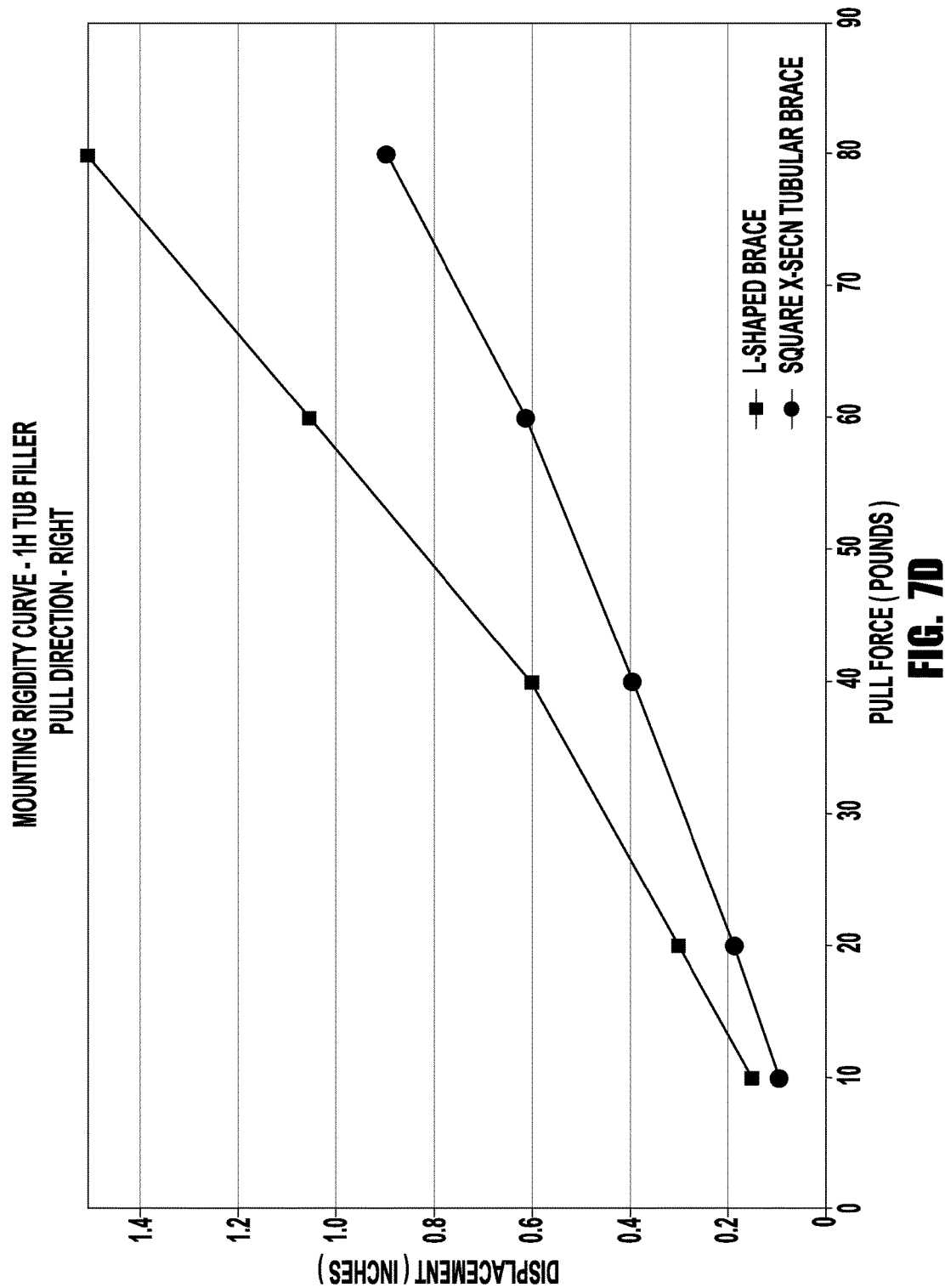

FIGS. 7a-7d are graphs showing results of the displacement vs. pull force tests conducted on the one-handle floor mounted tub filler according to the test setup of FIGS. 6a-6b. FIG. 7a shows displacement vs. forward pull force test results. FIG. 7b shows displacement vs. backward pull force test results. FIG. 7c shows displacement vs. left pull force test results. FIG. 7d shows displacement vs. right pull force test results.

One of ordinary skill in the art will now appreciate that the present invention provides a mounting system for a plumbing fixture fitting that provides a rigid mounting even when the plumbing fixture fitting has an extended height. Although the present invention has been shown and described with reference to a particular embodiment, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A mounting system for a plumbing fixture fitting having an extended height, the mounting system comprising:
a bracket, the bracket including a bracket base and a bracket flange, the bracket base forming a non-closed surface, the bracket base having a first end and a second end, the first end of the bracket base having an opening, the bracket base having a cross-section at or near the first end that is a simple closed shape, the bracket base including a top portion, a first side portion, and a second side portion, the top portion being operable to extend in a generally horizontal plane, the first side portion and the second side portion being operable to extend in a generally non-horizontal plane, at least one of the first side portion and the second side portion including a brace fastener opening extending therethrough, the brace fastener opening being a closed channel, the top portion including at least two fitting fastener openings extending therethrough, each fitting fastener opening being a closed channel, the fitting fastener openings being parallel to each other, the bracket flange being operable to be connected to a generally vertical bracket mounting surface;
a brace, the brace consisting of a planar brace base and a planar brace flange, the brace being generally L-shaped, the brace base being operable to extend in a generally non-horizontal plane, the generally non-horizontal plane in which the brace base extends being the same as the generally non-horizontal plane in which the first side portion and the second side portion of the bracket base extend, the brace base being operable to extend through the opening in the first end of the bracket base, the brace base including a bracket fastener opening extending therethrough, the bracket fastener opening being threaded, the brace flange being operable to be connected to a generally vertical brace mounting surface, the brace mounting surface being opposite the bracket mounting surface;
a bracket/brace fastener, the bracket/brace fastener being operable to extend through the bracket fastener opening in the brace base and the brace fastener opening in the bracket base, the bracket/brace fastener being operable to thread into the bracket fastener opening in the brace base; and
a fitting mounting fastener, the fitting mounting fastener being operable to extend through an opening in a plumbing fixture fitting component and one of the fitting fastener openings in the bracket base;
wherein the brace base is operable to be connected to at least one of the first side portion and the second side portion of the bracket base via the bracket/brace fastener;
wherein, once installed, the bracket/brace fastener does not extend through any component of the plumbing fixture fitting;
wherein the bracket is operable to be connected to the bracket mounting surface;
wherein the brace is operable to be connected to the brace mounting surface;
wherein the plumbing fixture fitting component is operable to be connected to the top portion of the bracket base via the fitting mounting fastener; and
wherein, once installed the fitting mounting fastener does not connect the brace base to any of the top portion, the first side portion, and the second side portion of the bracket base;
whereby the bracket and the brace can be rigidly mounted between the bracket mounting surface and the brace mounting surface; and
whereby the plumbing fixture fitting can be rigidly mounted to the bracket.

2. The mounting system of claim 1, wherein the bracket base is a rectangular tube.

3. The mounting system of claim 1, wherein the brace base is operable to be adjustably connected to the bracket base.

4. The mounting system of claim 1, wherein the bracket base is operable to be adjustably connected to the component of the plumbing fixture fitting.

5. The mounting system of claim 1, wherein:
the bracket brace includes a bottom portion; and
the bottom portion is operable to extend in a generally horizontal plane.

6. The mounting system of claim 1, further including a plate, wherein:
the plate includes a plate base;
the plate base includes a fitting fastener opening extending therethrough;
the fitting mounting fastener is operable to extend through the fitting fastener opening in the plate base; and
the plumbing fixture fitting component is operable to be connected to the plate base via the fitting mounting fastener.

7. A mounting system for a plumbing fixture fitting having an extended height, the mounting system comprising:
a bracket, the bracket including a bracket base and a bracket flange, the bracket base forming a non-closed surface, the bracket base having a first end and a second end, the first end of the bracket base having an opening, the bracket base having a cross-section at or near the first end that is a simple closed shape, the bracket base including a top portion and a first side portion, the top portion being operable to extend in a generally horizontal plane, the first side portion being operable to extend in a generally non-horizontal plane, the first side portion including a brace fastener opening extending therethrough, the brace fastener opening being a closed channel, the top portion including at least two fitting fastener openings extending therethrough, each fitting fastener opening being a closed channel, the bracket flange being operable to be connected to a generally vertical bracket mounting surface;
a brace, the brace consisting of a planar brace base and a planar brace flange, the brace being generally L-shaped, the brace base being operable to extend in a generally non-horizontal plane, the generally non-horizontal plane in which the brace base extends being the same as the generally non-horizontal plane in which the first side portion of the bracket base extends, the brace base being operable to extend through the opening in the first end of the bracket base, the brace base including a bracket fastener opening extending therethrough, the bracket fastener opening being threaded, the brace flange being operable to be connected to a generally vertical brace mounting surface, the brace mounting surface being opposite the bracket mounting surface;
a bracket/brace fastener, the bracket/brace fastener being operable to extend through the bracket fastener opening in the brace base and the brace fastener opening in the bracket base, the bracket/brace fastener being operable to thread into the bracket fastener opening in the brace base; and a fitting mounting fastener, the fitting mounting fastener being operable to extend through an opening in a plumbing fixture fitting component and one of the fitting fastener openings in the bracket base;

wherein the brace base is operable to be connected to the first side portion of the bracket base via the bracket/brace fastener;

wherein, once installed, the bracket/brace fastener does not extend through any component of the plumbing fixture fitting;

wherein the bracket is operable to be connected to the bracket mounting surface;

wherein the brace is operable to be connected to the brace mounting surface;

wherein the plumbing fixture fitting component is operable to be connected to the top portion of the bracket base via the fitting mounting fastener; and wherein, once installed the fitting mounting fastener does not connect the brace base to any of the top portion and the first side portion of the bracket base;

whereby the bracket and the brace can be rigidly mounted between the bracket mounting surface and the brace mounting surface; and whereby the plumbing fixture fitting can be rigidly mounted to the bracket.

8. The mounting system of claim 7, wherein the bracket base is a rectangular tube.

9. The mounting system of claim 7, wherein the brace base is operable to be adjustably connected to the bracket base.

10. The mounting system of claim 7, wherein the bracket base is operable to be adjustably connected to the component of the plumbing fixture fitting.

11. The mounting system of claim 7, wherein:
the bracket brace includes a second side portion; and
the second side portion is operable to extend in a generally non-horizontal plane.

12. The mounting system of claim 7, wherein:
the bracket brace includes a bottom portion; and
the bottom portion is operable to extend in a generally horizontal plane.

* * * * *